UNITED STATES PATENT OFFICE.

ALEXANDER BERNSTEIN, OF BOSTON, MASSACHUSETTS.

PROCESS OF PREPARING FOOD ARTICLES FROM MILK.

SPECIFICATION forming part of Letters Patent No. 589,155, dated August 31, 1897.

Application filed June 12, 1897. Serial No. 640,563. (No specimens.)

*To all whom it may concern:*

Be it known that I, ALEXANDER BERNSTEIN, a subject of the Emperor of Germany, residing at Boston, in the county of Suffolk and State of Massachusetts, have invented certain new and useful Improvements in Processes of Preparing Food Articles from Milk; and I do hereby declare the following to be a full, clear, and exact description of the invention, such as will enable others skilled in the art to which it appertains to make and use the same.

My present invention relates to the art of preparing permanent food articles from milk, and more particularly to the art of cheese-making, and is especially designed to secure a more desirable article of food from skimmed milk, or milk mainly deprived of its fat by a centrifugal or other mechanical separator. To those skilled in this art it is well known that when skimmed or separated milk is treated in the ordinary manner with rennet a curd is produced which is tough and almost indigestible, and when such curd is pressed in the ordinary mode of cheese-making and cured in the usual way a cheese is produced which is of very compact texture. Such cheese is inferior as an article of commerce and is objectionable as food, for the reason that it is hard, dry, and indigestible. The difference between this and the cheese made from milk in its natural condition is that the microscopic particles of fat are interposed throughout the curd and cheese between the particles of casein and prevent the latter from the close and intimate adhesion which takes place when the fat globules have been withdrawn from the milk.

The object of this invention is to produce from skimmed milk an article of food which can be kept for a long period and which will be free from the objections noted against the skimmed-milk product. This result I secure by keeping the particles of casein separated by another substance which takes the place of the withdrawn fatty particles, so that the particles of casein will not so closely cohere, but will remain separated and in such condition that they can be easily acted on by the juices of the stomach.

It is not necessary that the butter of the milk should be replaced by a fat, and I have found that the same result may be secured by the use of finely-divided carbohydrates, as found in various farinaceous materials. I have found wheat-flour to act in a uniform and effective manner.

In carrying out my process I proceed as follows: The skimmed milk is placed in a suitable receptacle, and a small amount of wheat-flour is added thereto, in about the proportion of ten grams of flour to one liter of milk. The flour is thoroughly mixed with and as evenly diffused through the milk as possible, while the temperature is raised to about 40° centigrade. A sufficient amount of rennet is now added to the mixture. Care should be taken to see that the amount of rennet is ample for the purpose. The mass is now stirred to effect the thorough incorporation of the rennet, and thereafter a sufficient amount of agitation is maintained to keep the flour well in suspension and prevent its settling until the action of the rennet has caused the milk to thicken sufficiently to render such agitation unnecessary. After coagulation has taken place I continue the heating and raise the temperature very gradually, so as to cause the curd to shrink slowly. When the volume of the curd has been reduced to about one-half of that of the milk, the whey is drawn off or removed and the curd placed in a strainer or filtering-cloth and the moisture retained in the mass allowed to drain from it. The curd so produced is very soft, similar to cream-cheese, and does not harden by lapse of time. By drying it a loose powder can be obtained which keeps without deterioration.

Acid might be used in place of rennet, but the product is not of as good or as uniform a quality as when rennet is employed.

Instead of wheat-flour other farinaceous materials, such as the meal and flour of other cereals, can be used in the same manner.

The curd produced can be made into cheese or made into a bread or other form of food. Such food articles can be made to contain the protein matter combined with the carbohydrates in proper proportions to sustain life.

What I claim, and desire to secure by Letters Patent, is—

1. The process of forming a food product from milk which consists in adding farinaceous material such as flour to the milk, then coagulating the milk while holding the flour in suspension, then removing the whey and moisture from the curd, substantially as described.

2. The process of forming a food product from skimmed milk which consists in adding farinaceous material such as flour to the milk, then coagulating the milk while holding the flour in suspension then contracting the curd by heat, then removing the whey and moisture from the curd, substantially as described.

3. An article of manufacture consisting of a curd, having farinaceous material such as flour included uniformly in the mass and interposed between the particles of casein, substantially as described.

In testimony whereof I affix my signature in presence of two witnesses.

ALEXANDER BERNSTEIN.

Witnesses:
FRED A. HOWARD,
WILLARD AMES.